C. & J. UHRINECZ.
RESILIENT TIRE STRUCTURE.
APPLICATION FILED APR. 12, 1917.
1,232,127.
Patented July 3, 1917.
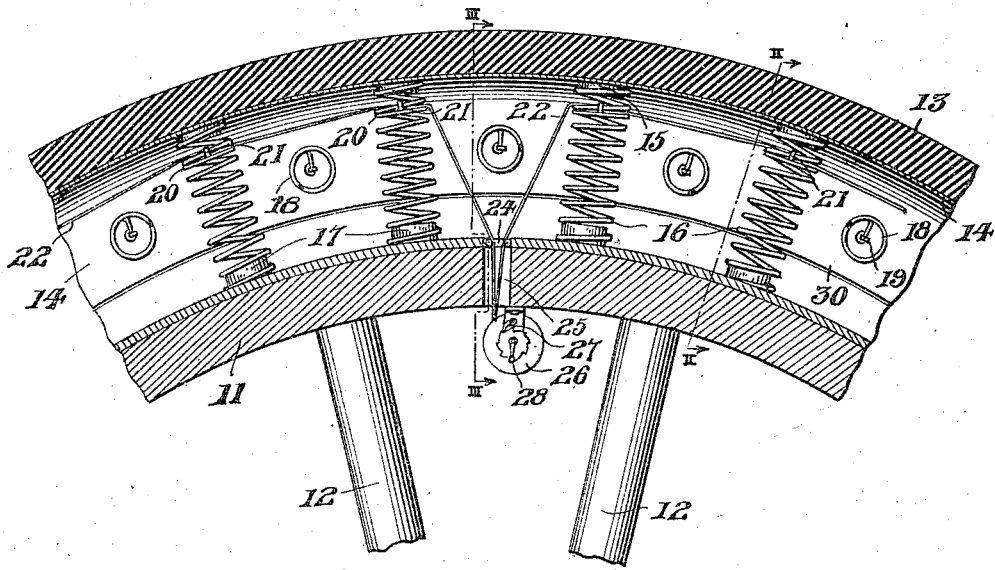
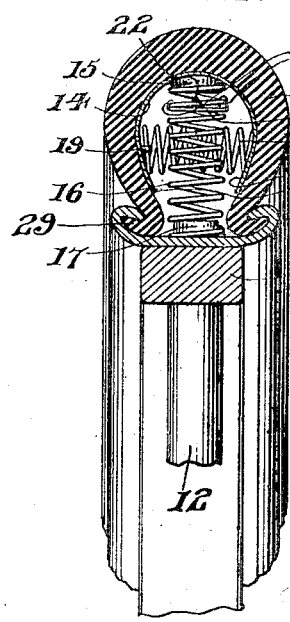
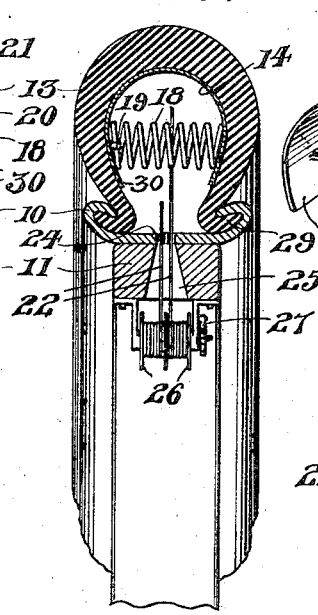
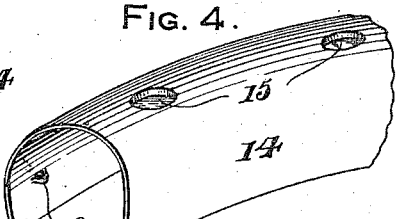
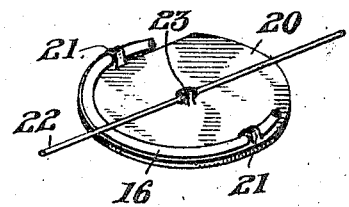
Inventors
C. Uhrinecz
J. Uhrinecz
By N. W. Wilson
Attorney

UNITED STATES PATENT OFFICE.

CHARLÝ UHRINECZ AND JOHN UHRINECZ, OF BINGHAMTON, NEW YORK.

RESILIENT-TIRE STRUCTURE.

1,232,127.  Specification of Letters Patent.  Patented July 3, 1917.

Application filed April 12, 1917. Serial No. 161,458.

*To all whom it may concern:*

Be it known that we, CHARLÝ UHRINECZ and JOHN UHRINECZ, subjects of the King of Hungary, residing at Binghamton, in the county of Broome and State of New York, have invented certain new and useful Improvements in Resilient-Tire Structures, of which the following is a specification.

This invention relates to certain new and useful improvements in resilient tire structures.

The primary object of the invention is the provision of a resilient tire for vehicle wheels readily adaptable for use in connection with the usual tire casing and clencher rim construction, the employment of an inner tube being dispensed with.

A further object of the device is the provision of a substitute for inner tubes employed with pneumatic tires, the same being in the nature of an insert for the tire shoe or casing, at all times maintaining the latter in its extended operative position without any danger of collapsing by reason of punctures or blow-outs.

A still further object of the device is to provide a resilient insert for tire casings having a ready means for adjusting the tension of certain members thereof as well as for permitting the ready removal of the casing from the rim whenever found desirable.

In the drawing forming a part of this application and in which like designating characters refer to corresponding parts throughout the several views:—

Figure 1 is a longitudinal sectional view through the outer portion of a wheel provided with the present device.

Figs. 2 and 3 are substantially radial sectional views taken upon lines II—II and III—III respectively, of Fig. 1, Fig. 3 having the radial spring omitted for the sake of clearness.

Fig. 4 is a perspective view of a portion of the tire armor employed with the device, and, Fig. 5 is a perspective view of one of the disks and a portion of the operating wire of the adjusting means.

The present structure is adapted for employment with the usual form of clencher rim 10 mounted upon a felly 11 of the wheel structure provided with spokes 12 while a tire shoe or casing 13 is removably mounted upon the said rim 10.

The present means for operatively extending the shoe 13 for use broadly consists of an annular metallic protector sheet 14 arranged within the shoe 13 closely engaging the sides thereof, the said sheet being arcuate in cross-section to conform to the shape of the shoe. The sheet 14 is formed of resilient metal and has a plurality of inwardly-extending bosses 15 struck in from the tread portion thereof to form positioning means for the outer ends of radially-arranged springs 16 positioned within the sheet 14 and shoe 13 with their inner ends seated over similar bosses or lugs 17 upon the outer face of the rim 10.

Positioning springs 18 are transversely arranged within the protector sheet 14 engaging the opposite sides thereof and secured only at one end to inwardly struck loops 19 arranged upon one side of the sheet 14. With the springs 18 and 16 positioned in this manner for supporting the protector 14 within the shoe 13 while the latter is mounted upon the rim 10, it will be seen that the shoe 13 will be maintained resiliently extended for the operation of the wheel which is provided therewith.

Disks 20 are secured within the springs 16 at points adjacent their outer ends in a convenient manner as by means of loops 21 formed upon the said disks and through which the helixes of the springs extend, a flexible operating means such as the wire 22, being passed entirely around the wheel within the protector sheet 14 and slidably positioned through central loops 23 of the disks 20. The opposite free ends of the wire 22 pass through a perforation 24 in the rim 10 and a similar perforation 25 in the felly 11 being then wrapped upon a suitable double reel 26 having a pawl and ratchet retaining means 27 and an operating turn crank 28. When the device is operatively assembled and it is desired to remove the shoe or casing 13, the crank 28 is turned for revolving the reel 26, thereby winding the wire 22 thereon which exerts a suitable tension upon the springs 16 which may be retained at a suitable adjustment if desired by means of the pawl and ratchet 27 but upon further winding up the wire 22 and depressing the disks 20, all of the springs 16 will be drawn inwardly beneath and away from the bosses 15 of the sheet 14, thereby releasing the sheet and permitting the shoe 13 to be readily removed in the usual manner by disconnecting the clencher flange members 29 in the well-known manner. The shoe 13 may be entirely removed from the wheel permitting the protector sheet 14 to remain upon the rim 10 ready for the reception of another shoe, it being understood that the sheet 14 has opposite free ends 30 in the nature of a split ring. However, the protector sheet 14 may be readily removed when the springs 16 are depressed in the manner heretofore described, the springs 18 being only fastened to the sheet at one end, permitting the springs 18 to freely pass the wire 22 during the removing operation of the sheet, either separately or simultaneously with the removal of the shoe 13. A readily operable resilient insert structure for tire shoes or casings is arranged which may be readily assembled upon the wheel and removed therefrom when found desirable.

What we claim as new is:—

1. A device of the class described comprising in combination with a felly having a clencher rim provided with a tire casing mounted thereon, a protector shoe arranged within the casing closely contacting the sides thereof, transversely-arranged springs within the protector attached at one end thereof, and adjustable radially positioned springs arranged between the protector and rim.

2. A device of the class described comprising in combination with a felly having a clencher rim provided with a tire casing mounted thereon, a protector shoe arranged within the casing closely contacting the sides thereof, transversely-arranged springs within the protector attached at one end thereof, opposite bosses carried by the said shoe and rim projecting inwardly of the shoe, radially-arranged springs normally seated upon the said bosses intermediate the said transverse springs, and tensioning means for said radial springs operable inwardly of the felly.

3. A device of the class described comprising in combination with a felly having a clencher rim provided with a tire casing mounted thereon, a protector shoe arranged within the casing closely contacting the sides thereof, transversely-arranged springs within the protector attached at one end thereof, opposite bosses carried by the said shoe and rim projecting inwardly of the shoe, radially-arranged springs normally seated upon the said bosses intermediate the said transverse springs, the said felly and rim having radial openings therethrough, disks carried by said radial springs, an operating wire slidably arranged upon the said disks annularly within the protector with its opposite ends projecting through the said openings, and winding means for the said wire carried by the inner face of said felly.

4. A device of the class described comprising in combination with a clencher rim having a tire casing mounted thereon, a sheet protector within said casing, normally expanded extending means for said casing alternately arranged radially and transversely with respect to said rim, and means for detaching said sheet from said radial members operable at a point inwardly of the rim.

In testimony whereof we affix our signatures.

CHARLÝ UHRINECZ.
JOHN UHRINECZ.